(12) United States Patent
Raiser

(10) Patent No.: US 7,906,242 B2
(45) Date of Patent: Mar. 15, 2011

(54) ACTIVE ISOLATION SYSTEM FOR FUEL CELL

(75) Inventor: Stephen Raiser, Egelsbach (DE)

(73) Assignee: GM Global Technology Operations LLC

( * ) Notice: Subject to any disclaimer, the term of this patent is extended or adjusted under 35 U.S.C. 154(b) by 1512 days.

(21) Appl. No.: 11/286,595

(22) Filed: Nov. 23, 2005

(65) Prior Publication Data

US 2007/0116997 A1    May 24, 2007

(51) Int. Cl.
*H01M 8/04* (2006.01)
(52) U.S. Cl. .......................................... 429/428; 429/433
(58) Field of Classification Search .................... 429/12, 429/23, 26; 324/537; 361/93.1
See application file for complete search history.

(56) References Cited

U.S. PATENT DOCUMENTS

| | | | |
|---|---|---|---|
| 7,355,831 B2 * | 4/2008 | Raiser | 361/93.1 |
| 2002/0192521 A1 * | 12/2002 | Raiser et al. | 429/26 |
| 2003/0113599 A1 * | 6/2003 | Pearson | 429/23 |
| 2004/0091759 A1 * | 5/2004 | Harrington et al. | 429/22 |
| 2004/0157091 A1 * | 8/2004 | Dewey et al. | 429/12 |

* cited by examiner

*Primary Examiner* — Jerry Lorengo
*Assistant Examiner* — Jared Wood
(74) *Attorney, Agent, or Firm* — Harness, Dickey & Pierce, P.L.C.

(57) ABSTRACT

A fuel cell system includes a fuel cell having conductive coolant flowing there through and a high voltage direct current (HVDC) bus interconnected with the fuel cell. An active isolation circuit includes coolant fault current sensors that detect a fault current (also called residual current) in the coolant and generates a fault signal when the fault current is detected. A switching circuit compensates and redirects the fault current based on the fault signal, providing active fault current limitation thereby.

15 Claims, 4 Drawing Sheets

ACTIVE ISOLATION SYSTEM FOR FUEL CELL

FIELD OF THE INVENTION

The present invention relates to fuel cells or other automotive HVDC sources and more particularly to voltage and/or current isolation systems for conductive (i.e., non-isolating) fluid cooled fuel cell stacks.

BACKGROUND OF THE INVENTION

Fuel cell stacks operate at relatively high voltage levels and higher temperatures. Liquid flowing through a coolant loop is typically used to control the temperature of the fuel cell stack. The coolant loop typically includes radiators, pumps, tubes and/or other components. To improve safety, steps are typically taken to isolate the high voltage levels of the fuel cell stack from the coolant flowing in the coolant loops. In other words, to provide electrical isolation, the coolant loops should be either electrically isolated or non-conductive coolant should be used.

Current approaches employ very low-conductivity or isolating coolant and long/thin isolating coolant tubes. For example, the low-conductivity coolant can be de-ionized (DI) water or the isolating coolant could be oil. The low-conductivity or isolating coolants typically have significant performance disadvantages when compared to higher conductivity coolants, such as automotive (i.e. water and glycol-based) coolants. For example, the isolating coolants typically have low heat capacity, low heat conductivity and high viscosity (e.g. oil). The isolating coolants therefore adversely impact system power density, radiator size, radiator fan size, and/or coolant pump power. The low-conductivity coolants may also pose various environmental constraints. The low-conductivity coolants lack anti-freeze characteristics and/or may cause corrosion (e.g., de-ionized water). Contaminations in the coolant system also tend to increase the conductivity of a low-conductivity coolant over time and hence isolation gets worse.

SUMMARY OF THE INVENTION

Accordingly, the present invention provides a fuel cell system including a fuel cell having coolant flowing therethrough and a high voltage direct current (HVDC) bus interconnected with the fuel cell. An active isolation circuit includes a first/second or multiple current sensors that connects to the coolant on the coolant exit/entrance paths to the fuel cell and detects a ground fault current in the coolant and generates a fault signal when the fault current is detected. A switching circuit redirects and compensates the fault current based on the fault signal.

In one feature, the first/second current sensor is immersed in the coolant.

In another feature, the switching circuit monitors the fault signal.

In another feature, the switching circuit includes an operational amplifier that receives the fault signal and that generates an output signal. A switching device selectively enables an alternate path to ground for the fault current based on the output signal. The switch includes MOSFET—transistors that enable the alternate path when in a conductive mode.

In another feature, the active isolation circuit further comprises a third or more fault sensors that detect the fault current in all coolant paths (exits/entrance/vents etc.) and contribute to the fault signal when the fault current is detected. The switching circuit includes an operational amplifier that generates an output signal and a first switch that selectively enables an alternate path from HVDC minus to ground for the fault current based on the output signal polarity. A second switch selectively enables an alternate path from HVDC plus to ground for the fault current based on the polarity of the output signal. When any of the fault sensors detects a positive fault current, the op-amp signals the first switch to enable the alternate path. When any of the fault sensors detects a negative fault current, the op-amp signals the second switch to enable the alternate path.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
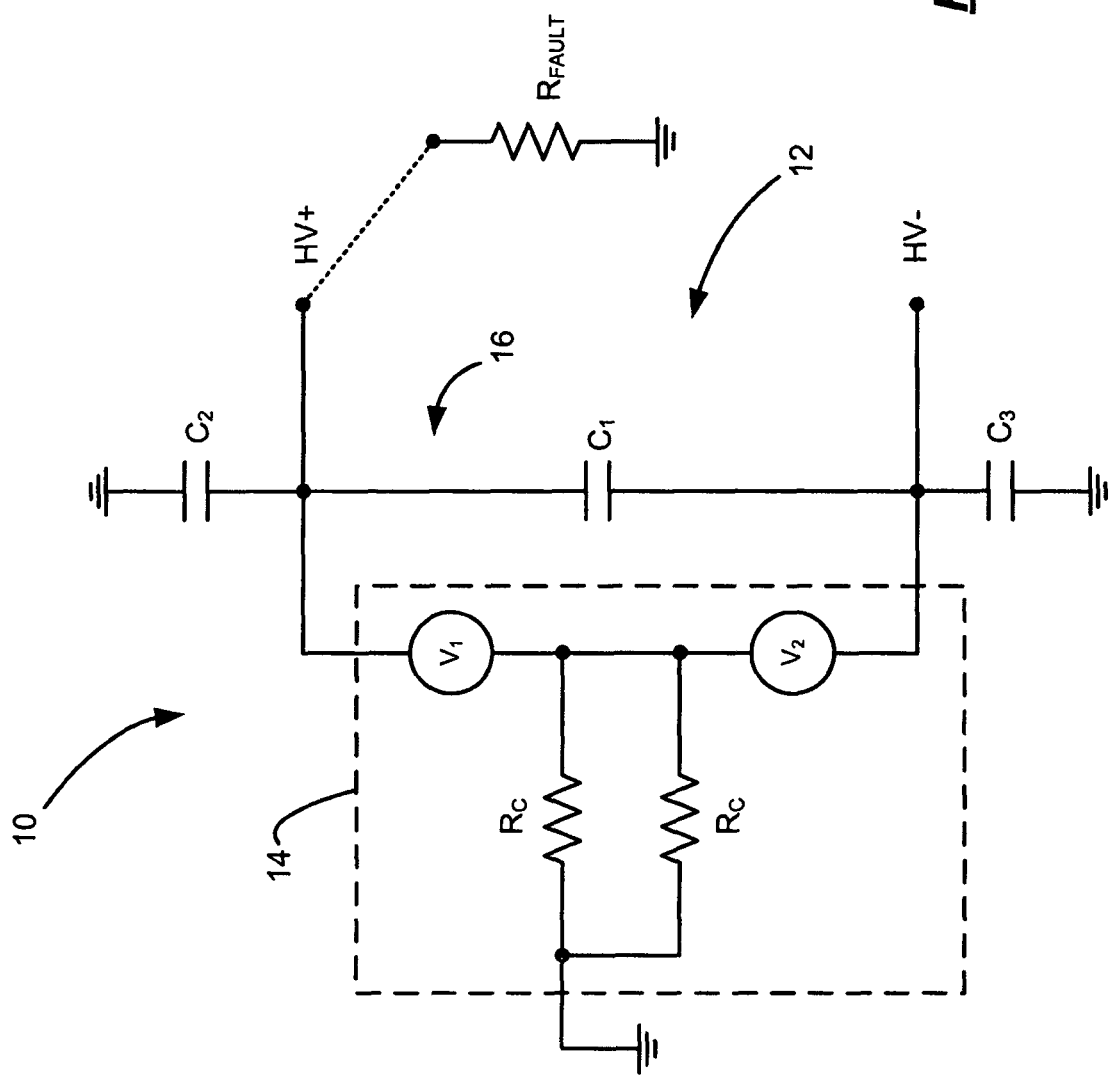
FIG. 1 is an electrical schematic of a conductive liquid cooled fuel cell system high voltage (HV) bus including Y-capacitors.

The following description of the preferred embodiments is merely exemplary in nature and is in no way intended to limit the invention, its application, or uses. For purposes of clarity, the same reference designations will be used in the drawings to identify similar elements.

Referring now to FIG. 1, a fuel cell system 10 includes a high voltage direct current (HVDC) power bus 12 and a fuel cell stack 14. The fuel cell stack 14 is represented as two voltage sources $V_1$ and $V_2$. Exemplary values for $V_1$ and $V_2$ are 200V, although other values may be used. Assuming 200V for $V_1$ and $V_2$, the total voltage across the fuel cell stack 14 is 400V. The fuel cell stack 14 includes conductive coolant flowing through manifolds. The coolant entering/exiting the fuel cell is indicated as parallel resistors $R_c$. Exemplary values for the resistors $R_c$ are 20 kΩ each or 10 kΩ total. As the coolant may enter (exit) the fuel cell stack through manifolds at any defined points of the fuel cell, the resistors Rc may connect to the fuel cell voltage at any intermediate voltage and are shown in a balanced configuration (=entering/exiting the fuel cell in the middle) here for clarity.

The HVDC power bus 12 includes positive and negative nodes (HV+ and HV−, respectively) and a capacitor circuit 16. Given the exemplary values of $V_1$ and $V_2$ and assuming the voltage balance is symmetrical, HV+ is at +200V and HV− is at −200V. The cap circuit includes capacitors $C_1$, $C_2$ and $C_3$. Exemplary values for $C_1$, $C_2$ and $C_3$ are 3000 µF, 5 µF and 5 µF, respectively. The cap circuit 16 shields the HVDC power bus 12 from electromagnetic interference (EMI). The Y-capacitors C2,C3 bridges the HVDC power bus 12 to a vehicle chassis (not shown) or safety ground. The capacitors C1,C2,C3 may be distributed across multiple components of a real fuel cell system connected to the HVDC bus but are represented as lumped components here.

Figure 3:
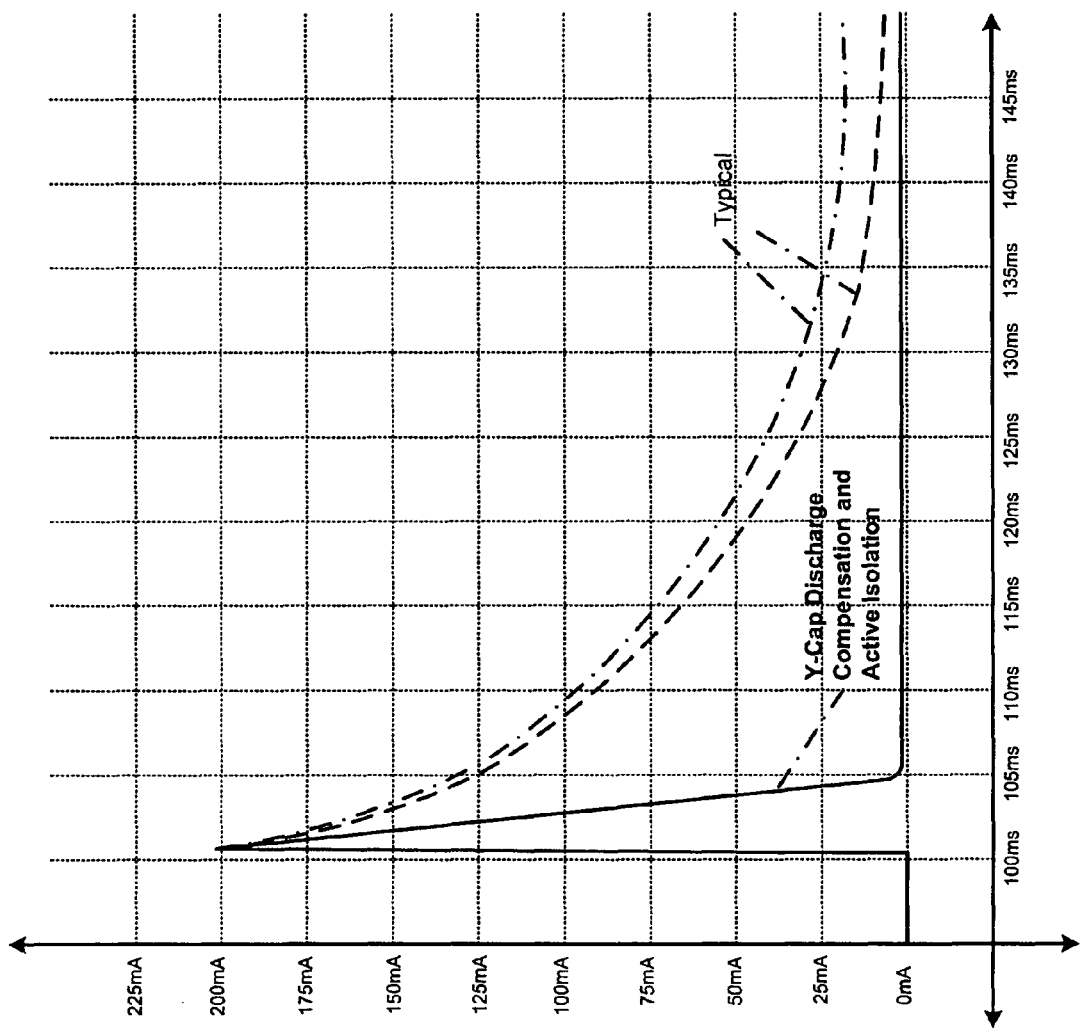
FIG. 3 is a graph illustrating fault discharge currents according to the present invention.

A typical fault contact, for example a human body, is indicated as a fault resistance $R_{FAULT}$. Although the fault contact is shown at HV+, the fault contact can also occur at HV− or at any intermediate voltage. An exemplary value for $R_{FAULT}$ is 1 kΩ. As a result of the fault contact, a discharge current causes the Y-cap circuit 16 to discharge through $R_{FAULT}$ to ground. The energy in the Y-cap circuit that is dissipated during the fault contact is equal to $\frac{1}{2}CV^2$. As shown in FIG. 3, which is discussed in further detail below, the typical discharge current immediately peaks upon fault contact and then gradually decreases to under 25 mA, given the exemplary values provided herein. The area beneath the typical discharge current curve indicates the energy that is dissipated through $R_{FAULT}$ (e.g., human body).

Figure 2:
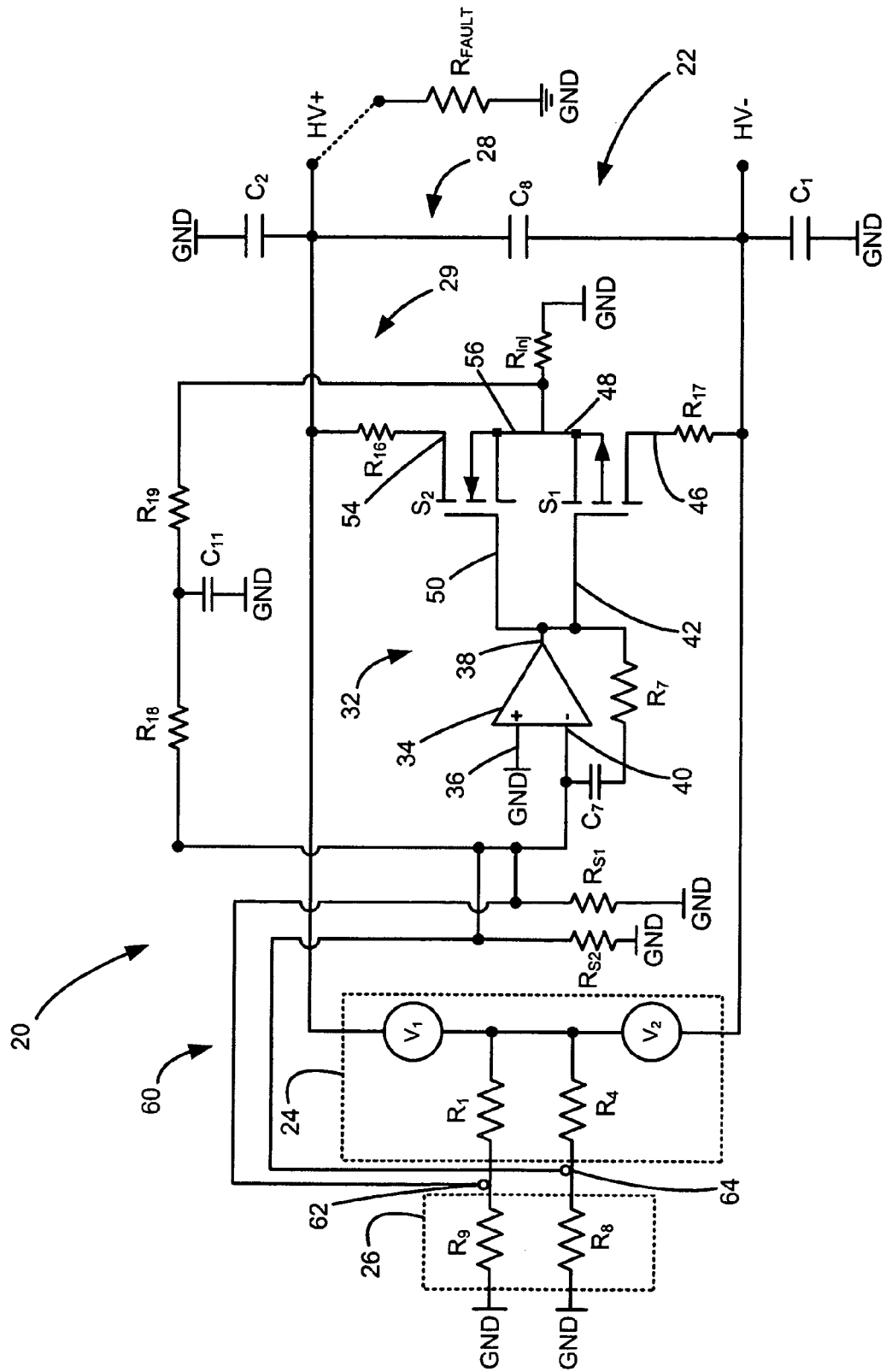
FIG. 2 is an electrical schematic of the HV bus incorporating an active isolation circuit according to the present invention.

Referring now to FIG. 2, a fuel cell system 20 includes a high voltage direct current (HVDC) power bus 22 and a fuel cell stack 24. The fuel cell stack 24 is represented as two voltage sources $V_1$ and $V_2$. Exemplary values for $V_1$ and $V_2$ are 200V, although other values may be used. Assuming 200V for $V_1$ and $V_2$, the total voltage across the fuel cell stack 24 is 400V. The fuel cell stack 24 includes conductive coolant flowing through manifolds, which is indicated as parallel resistors $R_1$ and $R_4$. Exemplary values for $R_1$ and $R_4$ are 22 kΩ and 18 kΩ, respectively. The coolant is provided by a coolant system 26 as indicated by parallel resistors $R_9$ and $R_8$. Exemplary values for $R_9$ and $R_8$ are 10 kΩ each. $R_9$ and $R_8$ are in respective series connection with $R_1$ and $R_4$.

The HVDC power bus 22 includes positive and negative nodes (HV+ and HV−, respectively) and a capacitor (cap) circuit 28. Given the exemplary values of $V_1$ and $V_2$ and assuming that the voltage balance is symmetrical, HV+ is at +200V and HV− is at −200V. The cap circuit 28 includes capacitors $C_8$, $C_1$ and $C_2$. Exemplary values for $C_8$, $C_1$ and $C_2$ are 3000 μF, 5 μF and 5 μF, respectively. The cap circuit 28 protects the HVDC power bus from electromagnetic interference (EMI). The Y-capacitors C1,C2 bridges the HVDC power bus to a vehicle chassis (not shown) or safety ground.

The fuel cell system 20 includes an active isolation circuit 29. The active isolation system consists of a monitoring circuit 60 and a switching circuit 32. The monitoring circuit 60 includes fault sensors 62, 64 that are associated with the coolant, and resistors RS1 and RS2. The fault sensors 62, 64 collect net fault current flowing through all coolant resistant paths of the fuel cell system 20 to ground through RS1,RS2. RS1,RS2 (which could be a single combined resistor) convert the fault currents coming from sensors 62,64 to a fault signal voltage. The fault signal voltage is connected to the inverting input 40 of the op-amp 34. The switching circuit 32 includes an operational amplifier (op-amp) 34, a first MOSFET transistor $S_1$ and a second MOSFET transistor $S_2$. The op-amp 34 includes a positive input 36 that is connected to ground. An output 38 is connected to Si and $S_2$. A negative input 40 is connected to the monitoring circuit and the output through a capacitor $C_7$ and a resistor $R_7$. $S_1$ includes a gate input 42 that is connected to the op-amp output 38. An input 46 (drain) is connected to HV− through a resistor $R_{17}$ and an output 48 (source) is connected to ground through a resistor $R_{INJ}$. $S_2$ includes a gate input 50 that is connected to the op-amp output 38. An input 54 (drain) is connected to HV+ through a resistor $R_{16}$ and an output 56 (source) is connected to ground through the resistor $R_{INJ}$. Exemplary values for $R_{16}$ and $R_{17}$ include 50Ω each and an exemplary value for $R_{INJ}$ includes 10Ω. $S_1$ and $S_2$ function as switches. When in a conductive state, $S_1$ or $S_2$ provide a current path from the HVDC bus positive or negative to ground through $R_{INJ}$ and R16 or R17. C11 and R19 provide low pass filtering for the injected current signal coming from $R_{inj}$. R18 feeds the filtered signal back to the Op-Amp input 40. Exemplary values for C11, R18, R19 include 1 μF, 5 kOhms and 5 kOhms.

In operation, in the event of a sufficient fault current through the coolant resistance paths, the active isolation circuit 60 signals the switching circuit 32 to provide an alternate current path to ground. For example, when a sufficient positive fault current is detected by the fault sensor 64 or 62, the op-amp output closes $S_2$ to create an alternate current path to ground through R16,$R_{INJ}$. As a result, the fault current is forced towards 0 mA. Similarly, when a sufficient negative fault current is detected by the fault sensor 62 or 64, the op-amp output closes $S_1$ to create an alternate current path to ground through R17,$R_{INJ}$, again resulting in the fault current being forced towards 0 mA.

The active isolation circuit 29 enables a fuel cell stack coolant scheme that includes a conductive coolant entering and exiting the fuel cell stack 24 at a common voltage potential plate or at any fuel cell voltage location. The voltage potential plate can include an end plate or a center tap plate in the case of multiple stack arrangements. The active isolation circuit 29 further provides an additional safety ground for all conductive components of the coolant loop that are in contact with the coolant. Furthermore, implementation of the active isolation circuit 29 requires the use of isolated or non-conductive coolant manifolds or non-conductive coolant entrance and exit areas to form a defined coolant resistance path upstream and downstream of the fault sensors 62, 64.

Figure 4:
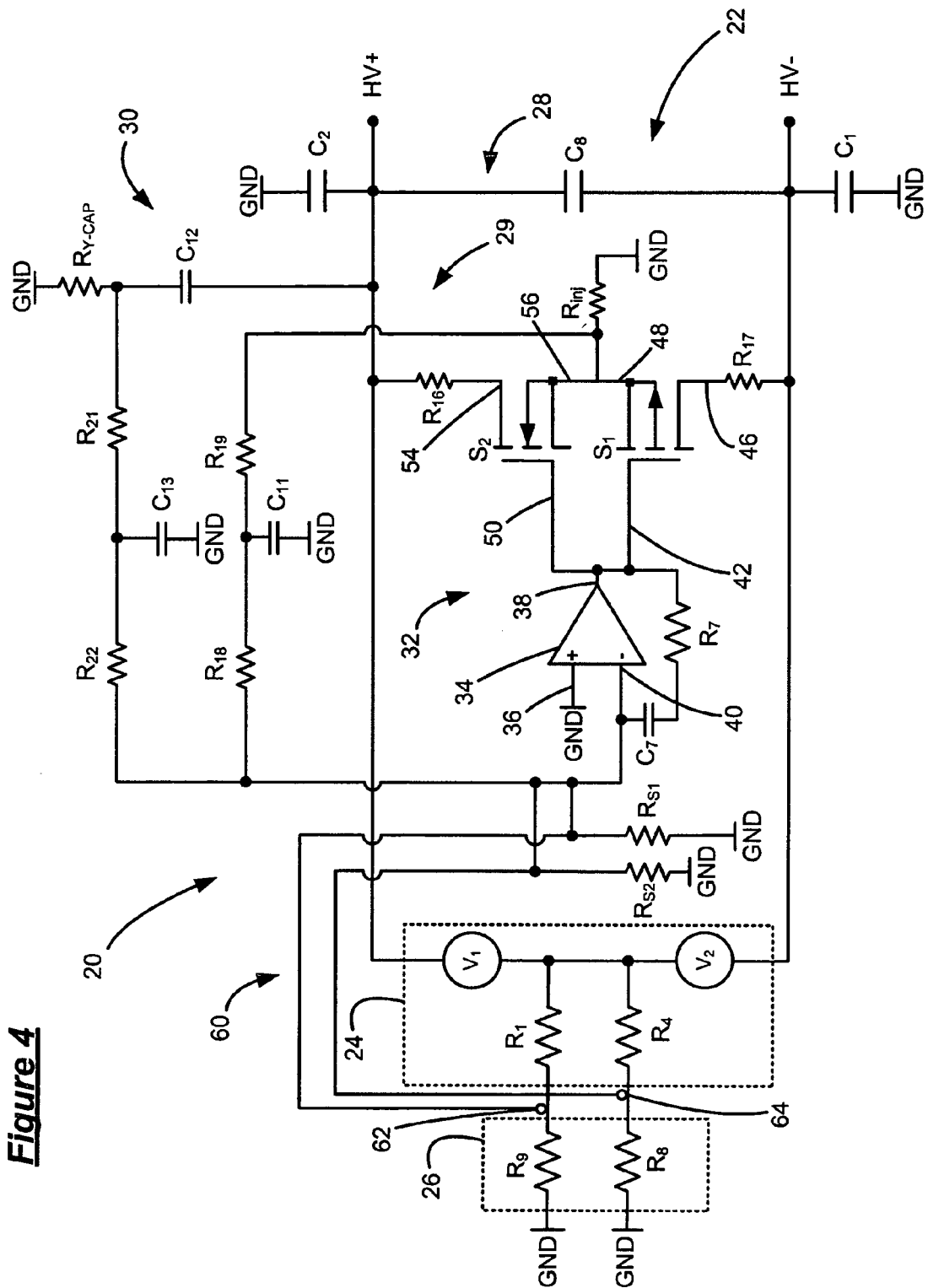
FIG. 4 is an electrical schematic of the HV bus incorporating a Y-capacitor (Y-cap) discharge compensation circuit and active isolation circuit according to the present invention.

Referring now to FIG. 4, an active isolation circuit with additional Y-cap discharge compensation circuit 29 bridges the HVDC power bus 22 and includes a monitoring circuit 30 and 60 and a switching circuit 32. The monitoring circuit 30 includes capacitors $C_{12}$ and $C_{13}$ and resistors $R_{Y-CAP}$, $R_{21}$ and $R_{22}$. Exemplary values for $C_{12}$ and $C_{13}$ include 1 μF each. An exemplary value for $R_{Y-CAP}$ includes 100Ω and exemplary values for $R_{21}$ and $R_{22}$ include 5 kΩ each. The monitoring circuit 60 also includes the fault sensors 62, 64 which are connected to the inverting input 40 of the op-amp 34 and ground through resistors $R_{S1}$ and $R_{S2}$, respectively. The fault sensors 62, 64 measure net fault current flowing through all coolant resistant paths of the fuel cell system 20 to ground through RS1,RS2.

The switching circuit 32 includes an operational amplifier (op-amp) 34, a first MOSFET transistor $S_1$ and a second MOSFET transistor $S_2$. The op-amp 34 includes a positive input 36 that is connected to ground. An output 38 is connected to $S_1$ and $S_2$. A negative input 40 is connected to the monitoring circuit and the output through a capacitor $C_7$ and a resistor $R_7$. $S_1$ includes a gate input 42 that is connected to the op-amp output 38. An input 46 (drain) is connected to HV− through a resistor $R_{17}$ and an output 48 (source) is connected to ground through a resistor $R_{INJ}$. $S_2$ includes a gate input 50 that is connected to the op-amp output 38. An input 54 (drain) is connected to HV+ through a resistor $R_{16}$ and an output 56 (source) is connected to ground through the resistor $R_{INJ}$. Exemplary values for $R_{16}$ and $R_{17}$ include 50Ω each and an exemplary value for $R_{INJ}$ includes 10Ω. $S_1$ and $S_2$ function as switches. When in a conductive state, $S_1$ or $S_2$ provide a current path from the HVDC bus positive or negative to ground through $R_{INJ}$ and R16 or R17.

In operation, the monitoring circuit 30 provides current to the switching circuit 32 indicating a discharge current of the Y-cap circuit 28. More particularly, the monitoring circuit 30 monitors the rate of change of voltage (dV/dt) of the cap circuit 28 with respect to ground. If dV/dt of the cap circuit 28 is greater than a threshold level, an external discharge current situation is indicated. That is to say, the Y-capacitors C2,C1 is being caused to discharge by a fault contact such as a person touching either HV+, HV− or any intermediate voltage point.

The op-amp 34 receives the current signal from the monitoring circuit 30 when dV/dt of the Y-cap circuit 28 exceeds a predetermined threshold. More particularly, the dV/dt signal is generated by the differentiating capacitor-resistor network that includes $R_{Y-CAP}$ and $C_{12}$. The dV/dt signal is filtered and smoothed by R21 and $C_{13}$. The filtered signal causes the output 38 of the Op-Amp to change to positive or negative depending on the sign of dV/dt, which depends on the fault location being on the positive or negative HVDC bus terminal. If the OpAmp output exceeds the turn on gate threshold voltage of the MOSFET switches S1 (e.g. −5V) or S2 (e.g. +5V), it causes S1 or S2 to turn on, which redirects the main fault discharge current path. For example, in the event of a fault at HV+, as illustrated in FIG. 4, the op-amp output closes $S_2$ to create a discharge path to ground through R16 and $R_{INJ}$. As a result, the energy of the Y-cap circuit 28 is dissipated mainly through R16 and $R_{INJ}$ instead of through $R_{FAULT}$. Similarly, in the event of a fault at HV−, the op-amp output closes $S_1$ to create a discharge path to ground through R17 and $R_{INJ}$. Although the fuel cell system 20 of FIG. 4 is shown to include both the Y-cap discharge compensation circuit 29 and the active isolation circuit 60 together, the function of the active isolation circuit 60 can be achieved using the active isolation circuit 60 and the switching circuit 32 alone.

Referring now to FIG. 3, a graph illustrates Y-cap fault discharge currents according to the present invention. Typical discharge currents for conventional circuits are illustrated by the highest dashed line. The discharge current for the active isolation circuit 29 of the present invention is illustrated by the middle dashed line. The discharge current drops to a much lower and safe steady state value, equivalent to a high isolation. The discharge current for the discharge compensation circuit 29 of the present invention is illustrated by the solid line. The discharge current drops more rapidly. Additionally, the area under each of the curves indicates the amount of energy dissipated through $R_{FAULT}$. A significantly decreased amount of energy is dissipated through $R_{FAULT}$ using the discharge compensation circuit 29.

Those skilled in the art can now appreciate from the foregoing description that the broad teachings of the current invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A fuel cell system, comprising:
   a fuel cell having coolant flowing therethrough;
   a high voltage direct current (HVDC) bus interconnected with said fuel cell; and
   an active isolation circuit for implementation with a fuel cell system having a coolant flowing therethrough, comprising:
   a first or multiple current sensor that detects a fault current in said coolant and generates a first fault signal when said fault current is detected; and
   a switching circuit that redirects said fault current based on said first fault signal.

2. The fuel cell system of claim 1 wherein said first current sensor is immersed in said coolant.

3. The fuel cell system of claim 1 wherein said switching circuit monitors said first fault signal.

4. The fuel cell system of claim 1 wherein said switching circuit comprises:
   an operational amplifier that receives said first fault signal and that generates an output signal; and
   a switching unit that selectively enables an alternate path from HV+ or HV− to ground for said fault current based on said output signal.

5. The fuel cell system of claim 4 wherein said switching unit includes MOSFET transistors that enables said alternate paths when in a conductive mode.

6. The fuel cell system of claim 5 wherein said switching circuit comprises:
   an operational amplifier that generates an output signal;
   a first switch that selectively enables an alternate path from HVDC minus to ground for said fault current based on the polarity of said output signal; and
   a second switch that selectively enables an alternate path from HVDC plus to ground for said fault current based on the polarity of said output signal.

7. The fuel cell system of claim 6 wherein when said current sensors detect a negative fault current said op-amp signals said first switch to enable said alternate path.

8. The fuel cell system of claim 6 wherein when said current sensors detect a positive fault current said op-amp signals said second switch to enable said alternate path.

9. The fuel cell system of claim 1 wherein said coolant is electrically conductive.

10. An active isolation circuit of a fuel cell system having a coolant flowing therethrough, comprising:
    a current sensor that detects a fault current in said coolant and generates a fault signal when said fault current is detected; and
    a switching circuit that redirects said fault current based on said fault signal.

11. The active isolation circuit of claim 10 wherein said current sensor is immersed in said coolant.

12. The active isolation circuit of claim 10 wherein said switching circuit monitors said fault signal.

13. The active isolation circuit of claim 10 wherein said switching circuit comprises:
    an operational amplifier that receives said fault signal and that generates an output signal; and
    a switch that selectively enables an alternate path to ground for said fault current based on said output signal.

14. The active isolation circuit of claim 13 wherein said switch includes MOSFET transistors that enable said alternate path when in a conductive mode.

15. The fuel cell system of claim 13 wherein when said current sensor detects said fault current said op-amp signals said switches to enable said alternate paths from HVDC plus to ground or HVDC minus to ground based on the fault current polarity, such that the coolant fault current is redirected or compensated towards 0 mA.

* * * * *